UNITED STATES PATENT OFFICE.

JOHN SWINDELLS, OF MANCHESTER, ENGLAND.

IMPROVEMENT IN THE MANUFACTURE OF CHROMATE OF SODA.

Specification forming part of Letters Patent No. 9,491, dated December 21, 1852.

*To all whom it may concern:*

Be it known that I, JOHN SWINDELLS, of Manchester, in the county of Lancaster, in that part of Great Britain and Ireland called England, manufacturing chemist, have invented certain improvements in obtaining products from ores and other matters containing metals, and in the preparation and application of several of such products for the purpose of bleaching, printing, dyeing, and color-making, of which the following is a specification.

My invention consists in the process for the production and manufacture of the chromate of soda for the purposes of bleaching, printing, dyeing, and color-making.

In the manufacture I proceed as follows: Take a quantity of ore containing chromium, and after having pulverized it I mix it with its own weight of common salt or of muriate of potash or hydrate of lime, and if I want a product containing soda—as the alkali—I take the mixture containing common salt and expose it in a reverberatory furnace to a full red or even to a white heat, applying at the same time a jet of steam at a very elevated temperature, (the exact temperature is not material to the success of the process,) stirring the mixture in the furnace every ten or fifteen minutes until the effect required is produced, which will be ascertained by taking a small quantity from the furnace and testing it, as it is usual to do. When the process is finished the product will be chromate of soda, the hydrochloric acid having carried away the iron, or most of it, in the shape of sesquichloride of iron. The product withdrawn from the furnace I treat as usual in the manufacture of chromic or bichromic salts. I proceed in the same way with the potash-salt mixture, and also with the lime mixture. From the first mixture of materials I manufacture pure bichromate of soda, and by adding hydrochloric acid I produce chlorochromate of soda, and from the last or lime mixture I manufacture chromate of lime, or by the addition of soda or potash a compound salt of soda or potash and lime.

Having now described the nature of my said invention and the manner in which the same is to be performed, I hereby declare that I claim as my invention—

The process described for manufacturing the chromate of soda.

JOHN SWINDELLS.

Witnesses:
  WILLIAM NICHOLSON,
    *Engineer, Manchester.*
  THOMAS EDMUNDSON,
    *Clerk, Manchester.*